(12) United States Patent
Matsuzawa (10) Patent No.: US 12,456,489 B2
(45) Date of Patent: Oct. 28, 2025

(54) MAGNETIC DISK DEVICE (71) Applicants: Kabushiki Kaisha Toshiba, Tokyo (JP); Toshiba Electronic Devices & Storage Corporation, Tokyo (JP)

(72) Inventor: Takuji Matsuzawa, Kashiwa Chiba (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/600,894

(22) Filed: Mar. 11, 2024

(65) Prior Publication Data
US 2024/0321304 A1 Sep. 26, 2024

(30) Foreign Application Priority Data

Mar. 23, 2023 (JP) ................. 2023-046871

(51) Int. Cl.
G11B 5/00 (2006.01)
G11B 5/596 (2006.01)
G11B 20/10 (2006.01)

(52) U.S. Cl.
CPC ...... *G11B 5/59688* (2013.01); *G11B 5/59622* (2013.01)

(58) Field of Classification Search
CPC .. G11B 5/54; G11B 5/58; G11B 5/012; G11B 5/00; G11B 5/09; G11B 5/596; G11B 20/10; G11B 20/10013; G11B 20/10046; G11B 5/035; G11B 5/02; G11B 20/10027
USPC .......................................... 360/75
See application file for complete search history.

(56) References Cited

U.S. PATENT DOCUMENTS

| | | | |
|---|---|---|---|
| 5,072,318 A | 12/1991 | Yu | |
| 6,636,376 B1 | 10/2003 | Ho | |
| 7,054,094 B2 | 5/2006 | Zhang et al. | |
| 8,503,124 B2 * | 8/2013 | Uchida | G11B 5/59622 360/55 |
| 2002/0093754 A1 | 7/2002 | Zhang et al. | |
| 2011/0069411 A1 | 3/2011 | Uchida et al. | |

* cited by examiner

*Primary Examiner* — Nabil Z Hindi
(74) *Attorney, Agent, or Firm* — Kim & Stewart LLP (57) ABSTRACT

According to one embodiment, a magnetic disk device includes a loop shaping filter by a digital filter, which is disposed in parallel to a controller, having a peak at certain frequency, and coefficients of which are determined by a sensitivity function and a controlled object, wherein the coefficients of the loop shaping filter of the digital filter based on a change in a sampling period of servo information.

7 Claims, 11 Drawing Sheets

MAGNETIC DISK DEVICE

CROSS-REFERENCE TO RELATED APPLICATIONS

This application is based upon and claims the benefit of priority from Japanese Patent Application No. 2023-046871, filed Mar. 23, 2023, the entire contents of which are incorporated herein by reference.

FIELD

Embodiments described herein relate generally to a magnetic disk device.

BACKGROUND

In magnetic disk devices such as a hard disk drive, tracking control is performed to align the position of a head with a target track of rotating disk. In this tracking control, a positional relationship between the head and the disk using servo information written on the disk, and a loop shaping filter may be used in order to suppress disturbance factors such as non-repeatable run-out (NRRO) which degrades tracking accuracy.

However, if a sampling period of the servo information is changed when, for example, a rotation number of the disk changes, characteristics of the filter which suppresses the non-repeatable run-out (NRRO) or the like may possibly be changed.

Embodiments of the present application present a magnetic disk device which can adapt to a sampling period of servo information for changing filter characteristics of a controller.

DETAILED DESCRIPTION

Hereinafter, embodiments will be explained with reference to the accompanying drawings. Note that, the figures indicate merely examples, and the scope of the invention is not limited thereby.

In general, according to one embodiment, a magnetic disk device includes a loop shaping filter by a digital filter, which is disposed in parallel to a controller, having a peak at certain frequency, and coefficients of which are determined by a sensitivity function and a controlled object, wherein the coefficients of the loop shaping filter of the digital filter based on a change in a sampling period of servo information.

First Embodiment

A magnetic disk device of the present embodiment recalculates, upon detection of a change in a sampling period of servo information, a filter coefficients, and changes a filter to suppress NRRO.

Figure 1:
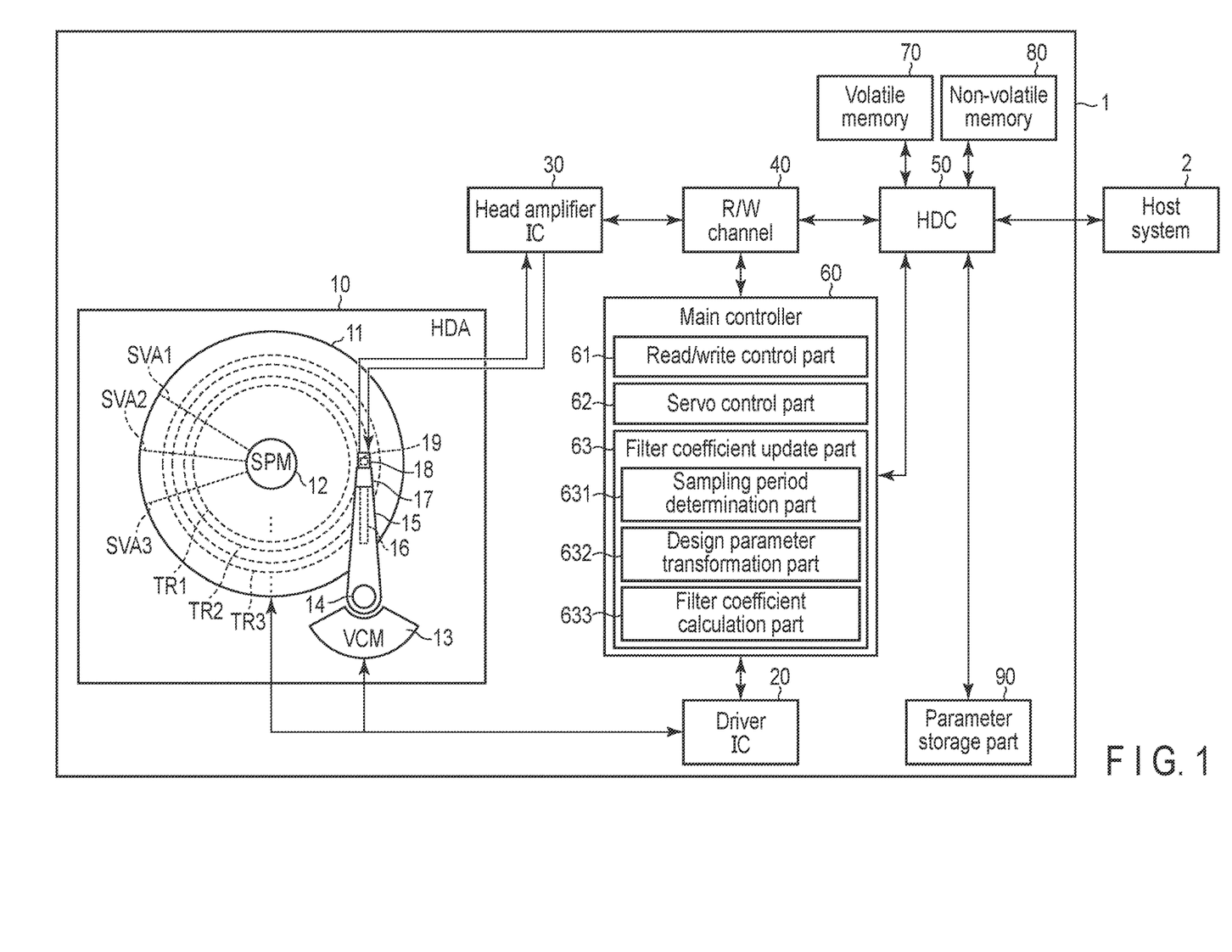
FIG. 1 is a structural diagram of a magnetic disk device of a first embodiment.

FIG. 1 is a structural diagram of the magnetic disk device of the embodiment.

A magnetic disk device 1 is a storage device with a magnetic disk 11 which can read/write data therefrom/therein (hereinafter, may be referred to as disk), and includes a processing device for example, such as a microprocessor with a computing function. The magnetic disk device 1 outputs data to a host system 2 and writes data input from the host system 2 to the disk 11 based on, for example, a command received from the host system 2.

The host system 2 is, for example, a personal computer, and outputs a read command which is a data read command of the disk 11 and a write command which is a data write command together with data to be written to the disk with respect to the magnetic disk device 1. Furthermore, the host system 2 may output information of a sampling period of servo information included in the disk 11 of the magnetic disk device 1 and designates the information to the magnetic disk device 1.

HDA 10 may be referred to as head disk assembly, and the magnetic disk 11, spindle motor (hereinafter, may be referred to as SPM) 12, arm 15 with a head 19 mounted thereon, and voice coil motor (hereinafter, may be referred to as VCM) 13 are stored in the enclosure, for example. In the HDA 10 of the present embodiment, one disk 11 and one head 19 are disposed; however, the number thereof may be one or more.

The disk 11 is a disk-shaped magnetic rotatable disk storage medium including a data writable (may be referred to data write) area in which a user data area which can be used by a user and a system area in which information required for the system management are assigned. Hereinafter, a direction orthogonal to a radial direction of the disk 11 will be referred to as circumferential direction. The disk 11 is attached to the spindle motor 12 and is rotated by the drive of the spindle motor 12.

A plurality of tracks are set in the disk 11. In FIG. 1, three tracks TR1, TR2, and TR3 (or may be referred to as track TR if specific distinction is unnecessary) are shown for example while a plurality of tracks are set in a concentric manner about the spindle 12 in the data area. When executing read/write of data from/to the disk 11, a head 19 is moved to a track TR with data to be written/read (may be referred to as target data) through a seek control, tracking control, and the like, and the head 19 performs the read/write. The track TR with target data may be referred to as target track.

Furthermore, servo information is written to the disk 11, which is used for a positional detection of the head 19, for example. The servo information is located in a position predetermined in the circumferential direction of the disk 11 (will be referred to as servo area). The servo information is a conventional technique, and thus, the detailed description thereof will be omitted. In the example of FIG. 1, three servo areas SVA1, SVA2, and SVA3 (or may be referred to as servo area SVA if specific distinction is unnecessary) are shown as an example of the servo area, however, generally, servo areas SVA are arranged in the entirety of the circumferential direction of the disk 11 at regular intervals, and the servo information is written in the servo area SVA in each track TR. The magnetic disk device 1 can detect a current position of the head 19 using the servo information read by the head 19.

The spindle 12 is a pillar of the disk 11, and is provided with, for example, the enclosure of the magnetic disk device 1. When the spindle 12 rotates, the disk 11 rotates accordingly.

The VCM 13 is a voice coil motor type actuator, and is used to move the arm 15, or the like. The VCM 13 controls an operation of the arm 15 based on current or a voltage input thereto.

A pivot 14 supports the arm 15, and the like, and is a bearing for rotation motion, for example.

The arm 15 is an arm supporting the slider 18 and the head 19, transfers motion from the VCM 13 to the head 19, and moves the head 19 to a target track TR.

A micro actuator 17 is connected to a suspension 16.

The micro actuator 17 (may be referred to as MA 17) performs a fine positional tuning including a tracking control of the head 19 based on current or voltage input thereto. The micro actuator 17 is a conventional function and the detailed description thereof will be omitted; however, it is noted that the micro actuator 17 performs fine positioning of the head 19 as to a position in a settling time after the seek control, and performs the tracking control with respect to a target track after the seek control. Settling is a condition after the movement of the head 19 by the seek control, wherein a positioning difference with respect to the target track falls within a threshold in consideration of influence of oscillation of the head 19 by the seek control. After the oscillation of the head 19 is sufficiently reduced by the settling, the read/write control of data and the tracking control are executed.

The slider 18 includes the head 19.

The head 19 is a portion to write data to the disk 11 and to read data recorded in the data tracks of the disk 11. Specifically speaking, the head to write data to the disk 11 will be referred to as write head 19W and the head to read data recorded in the data tracks of the disk 11 will be referred to as read head 19R.

A driver IC 20 outputs current or a voltage to drive and/or control the SPM 12, VCM 13, and micro actuator 17 according to the control from the HDC 50 and a servo control part 62.

A head amplifier IC 30 includes, for example, a read amplifier and a write driver. The read amplifier amplifies a read signal read from the disk 11 to be output to an R/W channel 40. The write driver outputs write current corresponding to a signal output from the R/W channel 40 to the head 19.

The R/W channel 40 controls, in response to an instruction from the HDC 50, main controller 60, and the like, the head amplifier IC 30 to perform data read from the disk 11 and data write to the disk 11. The R/W channel 40 receives a read data signal from the head amplifier IC 30 to extract read data, and generates write data signal based on write data commanded to be written to be output to the head amplifier IC 30. Furthermore, the R/W channel 40 has a function to measure signal quality of the read data received from the head amplifier IC 30. The R/W channel 40 may extract positional information of the head 19 based on the servo information signal received from the head amplifier IC 30.

The HDC 50 is an interface between the magnetic disk device 1 and the host system 2, and is a hard disk controller to control each component of the magnetic disk device 1. The HDC 50 may be structured with a processing device (a processor) with a computing function such as CPU, and IC chip with other processing functions. The HDC 50 receives, for example, commands such as data write command of data from the host system 2 to the disk 11 and data read command to the disk 11. Based on the received commands, the HDC 50 controls each component of the magnetic disk device 1, and exchanges data between the host system 2 and the R/W channel 40. The HDC 50 may control write/read of data to/from a volatile memory 70, parameter storage part 90, and nonvolatile memory 80.

The main controller 60 is a main controller to control each component of the magnetic disk device 1, and includes a computing function which executes one or more computing processes, and may be structured with a processing device (a processor) such as microprocessor, and an IC chip with other processing device functions. Various processes of the main controller 60 may be executed by program such as software (including firmware), or hardware, or a combination of software and hardware.

A read/write control part 61 selects a storage destination of write data (for example, information of data sector, and track of the disk 11) based on the command received from the host system 2, in order to control the write operation of data to the disk 11. The read/write control part 61 notifies a storage destination of read data (for example, information of data sector, and track of the disk 11) to the servo control part 62 based on the command received from the host system 2 to control the head 19, in order to control the read operation of the data of the disk 11.

The servo control part 62 controls the head 19 based on the command received from the host system 2, for example. The servo control part 62 executes the seek control and the tracking control to control the VCM 13 via the driver IC 20 in order to move the head 19 to a target position (target track). Furthermore, the servo control part 62 controls the micro actuator 17 via the driver IC 20, and executes the tracking control of the head 19.

Specifically, based on a target position of the head 19 determined based on the command received from the host system 2 and a current position of the head 19 received from a R/W channel 40, the servo control part 62 determines an input current value or an input voltage value as a control value for the seek control and the tracking control of the head 19, and outputs the value to the VCM 13 and the micro actuator 17.

The filter coefficient update part 63 includes a sampling period determination part 631, design parameter transformation part 632, and filter coefficient calculation part 633, and derives and updates filter coefficients of digital filter included in the controller indicative of a control system of the head 19 of the servo control part 62.

The sampling period determination part 631 determines a sampling period of servo information based on a command related to the sampling period of servo information received from the host 2 or the like, and rotation speed of the disk 11. Details will be described later.

The design parameter transformation part 632 transforms, in response to the sampling period, a parameter necessary for calculation of the filter coefficients (specifically referred to as design parameters), and outputs the parameters. Details will be described later.

The filter coefficient calculation part 633 calculates the filter coefficients from the designed parameters derived by the design parameter transformation part 632 and other parameters, and applies the filter coefficients to the loop shaping filter. Details will be described later.

A volatile memory 70 is a semiconductor memory which loses data stored therein if power supply thereto is cut. The volatile memory 70 stores data required for the processes of the magnetic disk device 1. The volatile memory 70 is, for example, Dynamic Random Access Memory (DRAM) or Synchronous Dynamic Radom Access Memory (SDRAM).

A nonvolatile memory 80 is a semiconductor memory to hold data stored therein even if power supply thereto is cut. The nonvolatile memory 80, for example, NOR or NAND flash ROM (Flash Read Only Memory: FROM).

The parameter storage part 90 is a semiconductor memory to store parameter and filter coefficient used in the filter coefficient update part 63. For example, the parameter storage part 90 is, for example, DRAM, Static Random Access Memory (SRAM), SDRAM, Ferroelectric Radom Access Memory (FeRAM), or Magnetoresistive Random Access Memory (MRAM). Note that, the parameter storage part 90 and the volatile memory 70 may be structured integrally.

Figure 2:
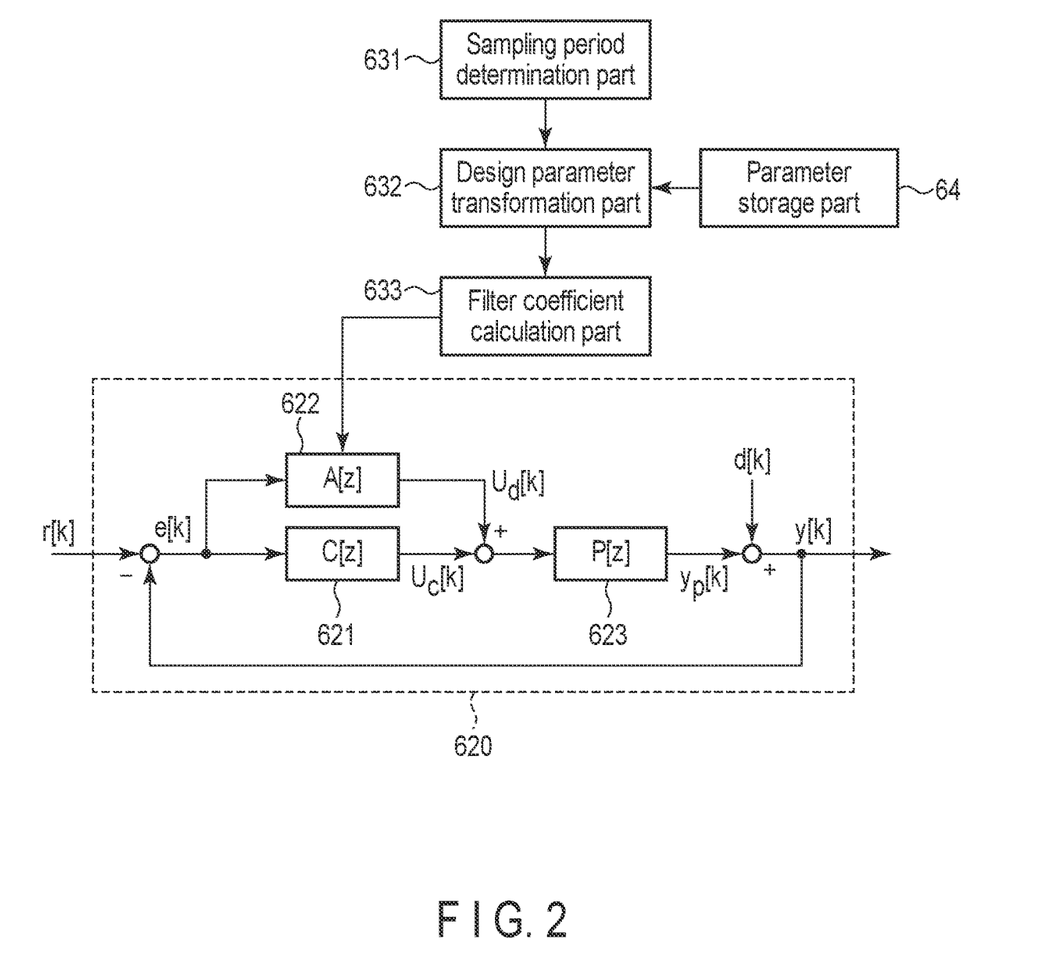
FIG. 2 illustrates an example of a block diagram of a servo control part and related parts in the magnetic disk device of the first embodiment.

FIG. 2 is a block diagram illustrating the servo control part and parts related thereto of the magnetic disk device of the first embodiment.

A control system 620 indicates the block diagram of the servo control part 62 including the head 19, and has a transfer function where a target position r[k] of the head 19 is an input and a current head position y[k] of the head 19 is an output, and r[k] and y[k] indicate discrete time signal and k indicates a sample time point. Hereinafter, a variable to which [k] is added indicates a discrete time signal.

A controller 621 is a controller to control the VCM 13 and the micro actuator 17, and has a transfer function C[z] of digital filter indicated by z transform. The controller 621 generates a control value $u_c[k]$ based on an input such as a difference (head position difference) e[k] between the target position r[k] and the current position y[k] of the head 19, and outputs the control value $u_c[k]$ to the VCM 13 and the micro actuator 17.

A loop shaping filter 622 has a transfer function A[z] of digital filter indicated by z transform. The loop shaping filter 622 outputs an output value $u_d[k]$, and a sum $u_c[k]+u_d[k]$ of the output values $u_c[k]$ from the controller 621 and the output value $u_d[k]$ from the loop shaping filter 622 is input to the VCM 13 and the micro actuator 17 as a control input. The filter coefficient update part 63 updates the filter coefficient in the loop shaping filter 622.

A controlled object 623 indicates the VCM 13 and the micro actuator 17, which has a transfer function of P[z].

The position y[k] of the head 19 is, with an output $y_p[k]$ of the controlled object 623 and a disturbance d[k], represented as $y[k]=y_p[k]+d[k]$. In the tracking control of the head 19, various oscillations are generated, causing the disturbance d[k], and the position y[k] of the head 19 is influenced. For example, NRRO is considered as a factor of the disturbance d[k].

Hereinafter, an operation of the present embodiment will be explained.

As in FIG. 2, the loop shaping filter 622 (may be referred to as filter A[z]) is disposed in parallel to the controller 621 in this structure, and filter A[z] is represented by formula 1.

$$A[z] = \frac{\mu}{\alpha} \frac{z^2 \cos\phi - \eta z \cos(\omega_0 T + \phi)}{z^2 - 2\eta z \cos\omega_0 T + \eta^2} \quad \text{(Formula 1)}$$

Note that, T is sampling period (sampling interval) of servo information, η and μ are design parameters, and α and Φ are represented by formula 2-1.

$$\alpha = |M_{ud}[e^{j\omega_0 T}]|, \phi = \arg(M_{ud}[e^{j\omega_0 T}]) \quad \text{(Formula 2-1)}$$

wherein $$M_{ud}[z] := \frac{P[z]}{1 + P[z]C[z]} \quad \text{(Formula 2-2)}$$

Note that α and Φ are matched with respect to a gain and a phase of suppression target frequency ω0 (hereinafter, referred to as first angular frequency) of transfer function $M_{ud}[z]$ of outputs $u_d[k]$ to $y_p[k]$ of the loop shaping filter 622 of FIG. 2 (hereinafter, a and (will be referred to as matching parameters). Furthermore, function of formula 2-2 whose numerator is one will be specifically referred to as sensitivity function. The sensitivity function indicates transfer function from disturbance d[k] to $y_p[k]$. That is, the coefficients of the loop shaping filter 622 can be determined in consideration of the sensitivity function and controlled object (corresponding to P[z]).

The above means that, in order to cancel disturbance d[k] by an estimated value of disturbance d[k] estimated from a position error signal e[k] in the filter A[z] of the loop shaping filter 622, the filter is designed in consideration of changes of the gain and the phase until the signal in the output $u_d[k]$ of the filter A[z] reaches the position of disturbance d[k].

After the filter is designed as above, sampling period T which is the sampling interval of servo information may be changed.

In the present embodiment, as a premise, even if the sampling period T is changed, the controller and a notch filter are adjusted such that frequency response become the same as with that before the change (sampling period in the design time) from viewpoints of stability and robustness. Thus, even if the sampling period T is changed, a and (do not change.

Figure 3:
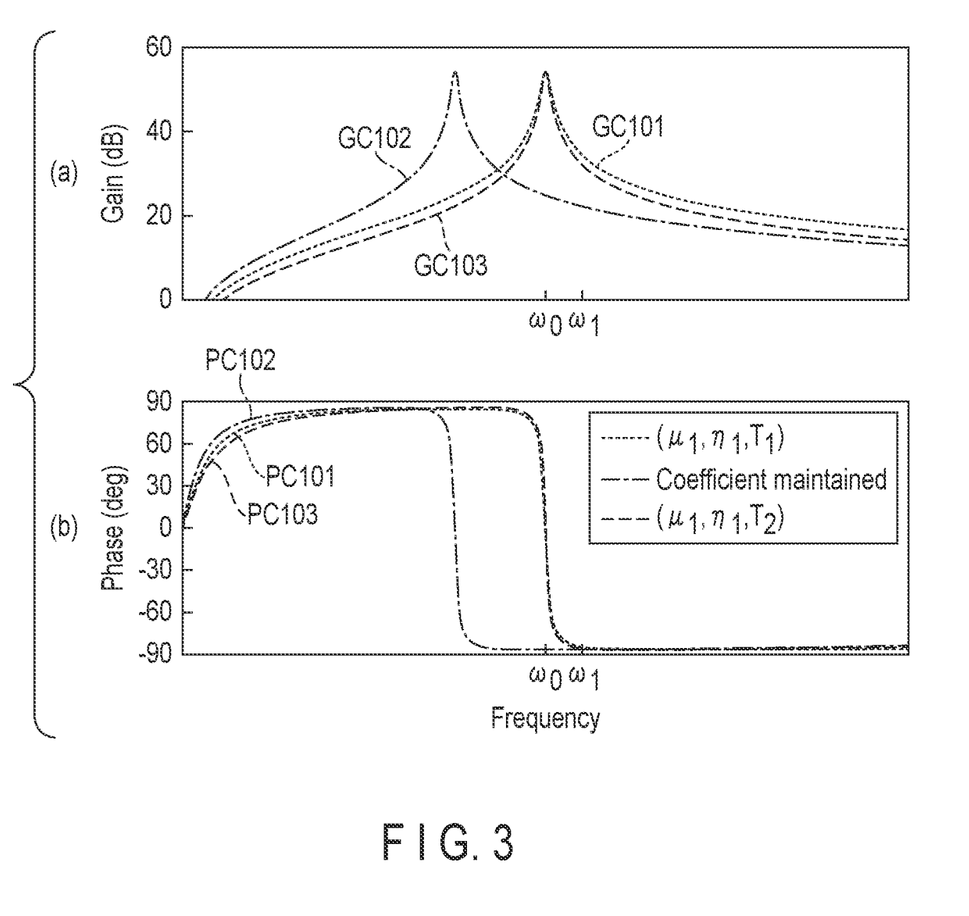
FIG. 3 illustrates an example of frequency response of filter A[z] of the magnetic disk device of the first embodiment.

FIG. 3 illustrates an example of frequency response of the filter A[z] of the magnetic disk device of the first embodiment.

GC 101 and PC 101 are gain characteristics and phase characteristics, respectively, of frequency response (gain characteristics and phase characteristics) of the filter A[z] coefficient of which is calculated from formula 1 where α and Φ are derived with respect to first angular frequency $\omega_0$ with a first sampling period $T_1$ in a preliminary design stage in order to derive first design parameters $\eta_1$ and $\mu_1$. The frequency response are represented by FC, and frequency response FC 101 including gain characteristics GC 101 and phase characteristics PC 101 will be indicated as follows.

GC 102 and PC 102 are gain characteristics and phase characteristics, respectively, in a case where variables ($T_1$, $\omega_0$, $\alpha$, $\Phi$, $\eta_1$, and $\mu_1$) are used as is in formula 1 without recalculating the coefficients when the sampling period $T_1$ changes to a second sampling period $T_2$. In FC 102, the peak frequency of the filter A[z] (frequency to be suppressed) changes.

GC 103 and PC 103 are examples when the filter coefficients is recalculated using the second sampling period $T_2$ and the first design parameters $\eta_1$ and $\mu_1$, that is, variables ($T_2$, $\omega_0$, $\alpha$, $\Phi$, $\eta_1$, and $\mu_1$) are applied in formula 1, and the peak frequency of gain characteristics GC 103 of filter A[z] matches that of gain characteristics GC 101 while the frequency response of the filter change, and desired characteristics cannot be obtained (as compared to FC 101, a difference occurs in each of the gain characteristics and the phase characteristics).

In the present embodiment, the design parameters $\eta$ and $\mu$ are changed based on the sampling period T such that the frequency response of filer A[z] in the proximity of the first angular frequency $\omega_0$ do not substantially change even when the sampling period T changes. Specifically, the design parameters $\eta$ and $\mu$ are calculated in the filter coefficient update part 63 (sampling period determination part, design parameter transformation part, and filter coefficient calculation part).

Hereinafter, a process of a filter coefficients update operation in the magnetic disk device 1 will be explained.

Figure 4:
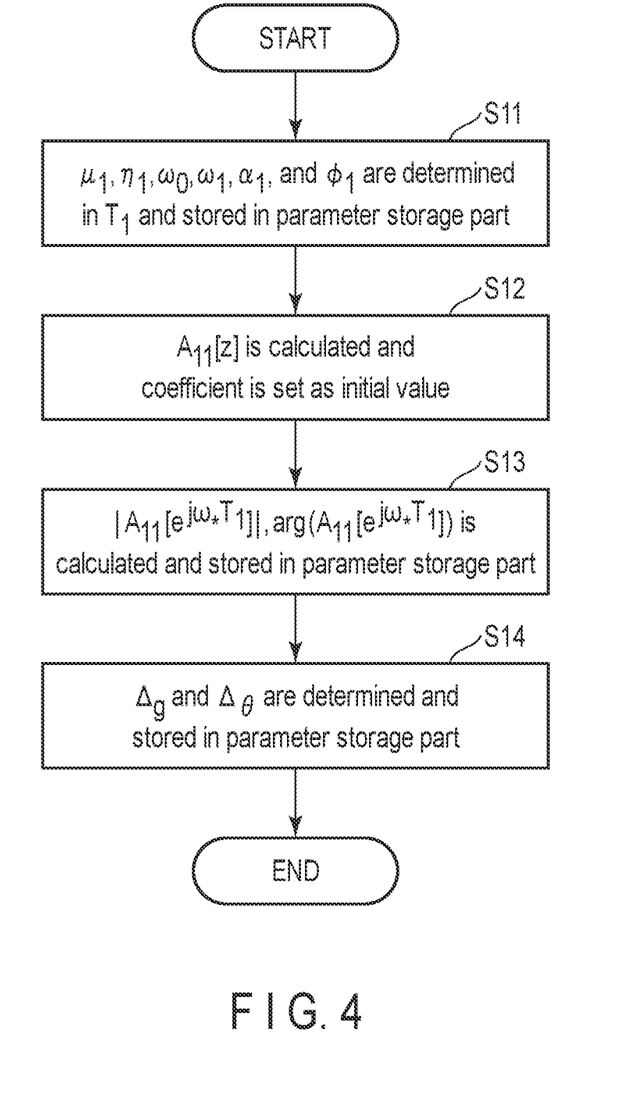
FIG. 4 is a flowchart of a process operation during the design phase prior to product shipment of the magnetic disk device of the first embodiment.

FIG. 4 is a flowchart indicative of a process operation during the design phase prior to product shipment of the magnetic disk device of the first embodiment.

In the magnetic disk device 1 of the present embodiment, matching parameters $\alpha_1$ and $\Phi_1$ and first design parameters $\eta_1$ and $\mu_1$ with respect to the first sampling period $T_1$ are derived as above in a preliminary design stage, and first angular frequency $\omega_0$ and second angular frequency $\omega_1$ which is a value close to first angular frequency $\omega_0$ are determined as factory setting by a manufacturer, for example, and the derived parameters and determined values are stored in the parameter storage part 90 (step S11). The second angular frequency $\omega_1$ may be determined from a half width at half maximum of the filter, or as suppression target frequency of adjacent filters when multiple filters are used.

Furthermore, the filter coefficient calculation part 633 of the magnetic disk device 1 calculates each coefficient of $A_{11}[z]$ of formula 3-1 from the parameters stored in the parameter storage part 90 in step S11, and sets the coefficients as an initial value to the loop shaping filter 622 (step S12).

$$A_{11}[z] = \frac{\mu_1}{\alpha} \frac{z^2\cos\phi - \eta_1 z\cos(\omega_0 T_1 + \phi)}{z^2 - 2\eta_1 z\cos\omega_0 T_1 + \eta_1^2} \quad \text{(Formula 3-1)}$$

The filter coefficient calculation part 633 derives an absolute value and a phase of the filter $A_{11}[z]$ derived in step S12 with respect to each of the angular frequency $\omega_0$ and the angular frequency $\omega_1$, and stores the derived value and phase in the parameter storage part 90 (step S13). Furthermore, in a manufacturer or the like, acceptable deviations $\Delta_g$ and $\Delta_\theta$ of the gain and phase are determined to be appropriate values derived from a preliminary test, and are stored in the parameter storage part 90 (step S14).

Through the aforementioned procedure, a preparation to use the magnetic disk device 1 is performed.

Figure 5:
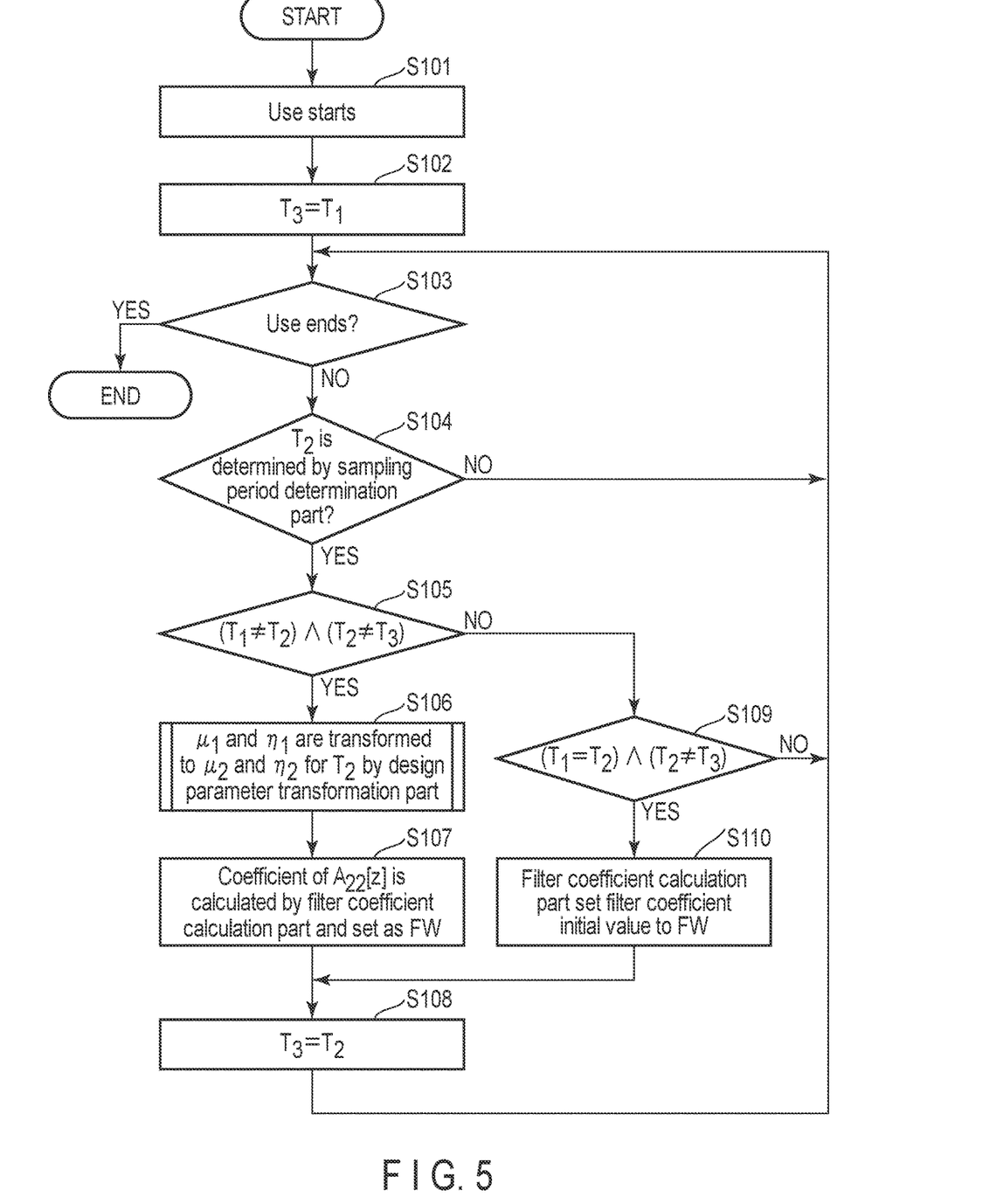
FIG. 5 is a flowchart of a process operation during the operation after shipment of the magnetic disk device of the first embodiment.

FIG. 5 is a flowchart of a process operation during the operation after shipment of the magnetic disk device of the first embodiment.

When the use of the magnetic disk device 1 is started through, for example, power supply thereto (step S101), the filter coefficient update part 63 sets $T_1$ which is an initial setting value of the sampling period stored in the parameter storage part 90 to the sampling period $T_3$ (step S102). The sampling period $T_3$ indicates a sampling period at the time when the coefficients set in the loop shaping filter 622 are calculated, and may be stored in a working memory such as a volatile memory 70, for example.

When, for example, the sampling period is designated by the host 2 and the sampling period $T_2$ is determined to be used (Yes in step S104), the sampling period determination part 631 compares values $T_1$, $T_2$, and $T_3$ of the sampling periods (step S105).

In step S105, if $T_1 \neq T_2$ and $T_2 \neq T_3$ (Yes in step S105), the design parameter transformation part 632 transforms the first design parameters $\eta_1$ and $\mu_1$ calculated for the first sampling period $T_1$ to second design parameters $\eta_2$ and $\mu_2$ for the second sampling period $T_2$ (step S106). Hereinafter, the transformation of step S106 will further be explained using formulae.

When the filter A[z] of the first sampling period $T_1$ and first design parameters $\eta_1$ and $\mu_1$ is $A_{11}[z]$ represented in formula 3-1, filter A[z] of the second sampling period $T_2$ and second design parameters $\eta_2$ and $\mu_2$ ($A_{22}[z]$) will be represented as formula 3-2.

$$A_{22}[z] = \frac{\mu_2}{\alpha} \frac{z^2\cos\phi - \eta_2 z\cos(\omega_0 T_2 + \phi)}{z^2 - 2\eta_2 z\cos\omega_0 T_2 + \eta_2^2} \quad \text{(Formula 3-2)}$$

Hereinafter, if formulae 3-1 and 3-2 are indicated at the same time, the part after—will be omitted, and will be referred to as formulae 3. The same applies to the following formulae, and the part after—will be omitted.

In step S106, for example, the second design parameters $\eta_2$ and $\mu_2$ are determined such that formulae 4 (formula 4-1 and formula 4-2) and formulae 5 (formula 5-1 and formula 5-2) are satisfied.

$$1 - \Delta_g \leq \left| \frac{A_{22}\left[e^{j\omega_0 T_2}\right]}{A_{11}\left[e^{j\omega_0 T_1}\right]} \right| \leq 1 + \Delta_g \quad \text{(Formula 4-1)}$$

$$1 - \Delta_g \leq \left| \frac{A_{22}\left[e^{j\omega_1 T_2}\right]}{A_{11}\left[e^{j\omega_1 T_1}\right]} \right| \leq 1 + \Delta_g \quad \text{(Formula 4-2)}$$

$$\left| \arg\left( \frac{A_{22}\left[e^{j\omega_0 T_2}\right]}{A_{11}\left[e^{j\omega_0 T_1}\right]} \right) \right| \leq \Delta_\theta \quad \text{(Formula 5-1)}$$

$$\left| \arg\left( \frac{A_{22}\left[e^{j\omega_1 T_2}\right]}{A_{11}\left[e^{j\omega_1 T_1}\right]} \right) \right| \leq \Delta_\theta \quad \text{(Formula 5-2)}$$

In formulae 4 and 5, if formulae 6 (formula 6-1, formula 6-2, and formula 6-3) are applied, formulae 7 (formula 7-1 and formula 7-2) are derived.

$$C_{xy} := \cos\omega_x T_y, \ s_{xy} := \sin\omega_x T_y, \quad \text{(Formula 6-1)}$$

$$C_{xy\phi} := \cos(\omega_x T_y + \phi), \ C_\phi := \cos\phi$$

$$\lambda_{xyz} := \frac{\alpha^2}{\mu_z^2}\left|A_{yz}\left[e^{j\omega_x T_y}\right]\right|^2 = \quad \text{(Formula 6-2)}$$

$$\frac{c_\phi^2 - 2c_\phi c_{xy} c_{0y\phi}\eta_z + c_{0y\phi}^2 \eta_z^2}{1 - 4c_{xy}c_{0y}\eta_z + 2(2c_{xy}^2 + 2c_{0y}^2 - 1)\eta_z^2 - 4c_{xy}c_{0y}\eta_z^3 + \eta_z^4}$$

$$\Phi_{xyz} := \arg\left(A_{yz}\left[e^{j\omega_x T_y}\right]\right) - \omega_x T_y \quad \text{(Formula 6-3)}$$

$$= \arg\left(\frac{e_{xy}c_\phi - c_{0y\phi}\eta_z}{e_{xy}^2 - 2e_{xy}c_{0y}\eta_z + \eta_z^2}\right)$$

$$\mu_1^2 \Lambda_{011}(1-\Delta_g)^2 \frac{1 - 4c_{02}^2 \eta_2 + 2(4c_{02}^2 - 1)\eta_2^2 - 4c_{02}^2 \eta_2^3 + \eta_2^4}{c_\phi^2 - 2c_\phi c_{02} c_{02\phi}\eta_2 + c_{02\phi}^2 \eta_2^2} \leq \mu_2^2 \leq \quad \text{(Formula 7-1)}$$

$$\mu_1^2 \Lambda_{011}(1+\Delta_g)^2 \frac{1 - 4c_{02}^2 \eta_2 + 2(4c_{02}^2 - 1)\eta_2^2 - 4c_{02}^2 \eta_2^3 + \eta_2^4}{c_\phi^2 - 2c_\phi c_{02} c_{02\phi}\eta_2 + c_{02\phi}^2 \eta_2^2}$$

$$\mu_1^2 \Lambda_{111}(1-\Delta_g)^2 \frac{1 - 4c_{12}c_{02}\eta_2 + 2(2c_{12}^2 + 2c_{02}^2 - 1)\eta_2^2 - 4c_{12}c_{02}\eta_2^3 + \eta_2^4}{c_\phi^2 - 2c_\phi c_{12} c_{02\phi}\eta_2 + c_{02\phi}^2 \eta_2^2} \leq \quad \text{(Formula 7-2)}$$

$$\mu_2^2 \leq \mu_1^2 \Lambda_{111}(1+\Delta_g)^2 \frac{1 - 4c_{12}c_{02}\eta_2 + 2(2c_{12}^2 + 2c_{02}^2 - 1)\eta_2^2 - 4c_{12}c_{02}\eta_2^3 + \eta_2^4}{c_\phi^2 - 2c_\phi c_{12} c_{02\phi}\eta_2 + c_{02\phi}^2 \eta_2^2}$$

In the present embodiment, an example where the second design parameters $\eta_2$ and $\mu 2$ are selected based on a gain deviation and a phase deviation. Specifically, the design parameter transformation part 632 calculates, if the first sampling period $T_1$ is changed to the second sampling period $T_2$, the gain deviation and the phase deviation of the frequency response using the filter coefficients derived with respect to the first sampling period $T_1$ and the frequency response using the filter coefficients derived with respect to the second sampling period $T_2$, and selects the second design parameters $\eta_2$ and $\mu 2$ satisfying condition formulae 7 (formula 7-1 and formula 7-2) where the gain deviation of the first angular frequency $\omega_0$ and the second angular frequency $\omega_1$ becomes a gain acceptable deviation $\Delta_g$ or less and condition formulae 9 (formula 9-1 and formula 9-2) where the phase deviation of the first angular frequency $\omega_0$ and the second angular frequency $\omega_1$ becomes a phase acceptable deviation $\Delta_\theta$ or less. Or, the second design parameters $\eta_2$ and $\mu_2$ satisfying formulae 8 (formula 8-1, formula 8-2, and formula 8-3) which is approximate to formulae 7, and formulae 10 (formula 10-1, formula 10-2, formula 10-3, and formula 10-4) instead of formulae 7 and formulae 9 may be selected.

$$\mu_1^2 \Lambda_{011}(1-\Delta_g)^2[a_{00} + a_{01}(\eta_2 - \eta_1)] \leq \mu_2^2 \leq \quad \text{(Formula 8-1)}$$

$$\mu_1^2 \Lambda_{011}(1+\Delta_g)^2[a_{00} + a_{01}(\eta_2 - \eta_1)]$$

$$\mu_1^2 \Lambda_{111}(1-\Delta_g)^2[a_{10} + a_{11}(\eta_2 - \eta_1)] \leq \mu_2^2 \leq \quad \text{(Formula 8-2)}$$

$$\mu_1^2 \Lambda_{111}(1+\Delta_g)^2[a_{10} + a_{11}(\eta_2 - \eta_1)]$$

where $$a_{00} = \frac{1}{\Lambda_{021}}, \ a_{10} = \frac{1}{\Lambda_{121}}, \ a_{01} = \quad \text{(Formula 8-3)}$$

$$\frac{4[-c_{02}^2 + (4c_{02}^2 - 1)\eta_1 - 3c_{02}^2 \eta_1^2 + \eta_1^3]}{c_\phi^2 - 2c_\phi c_{02} c_{02\phi}\eta_1 + c_{02\phi}^2 \eta_1^2} -$$

$$\frac{2(-c_\phi c_{02} c_{02\phi} + c_{02\phi}^2 \eta_1)}{\Lambda_{021}(c_\phi^2 - 2c_\phi c_{02} c_{02\phi}\eta_1 + c_{02\phi}^2 \eta_1^2)}, \ a_{11} =$$

$$\frac{2(-c_\phi c_{12} c_{02\phi} + c_{02\phi}^2 \eta_1)}{\Lambda_{121}(c_\phi^2 - 2c_\phi c_{12} c_{02\phi}\eta_1 + c_{02\phi}^2 \eta_1^2)}$$

$$-\Delta_\theta \leq \omega_0(T_2 - T_1) + \arctan\left(\frac{s_{02}c_\phi}{c_{02}c_\phi - c_{02\phi}\eta_2}\right) - \quad \text{(Formula 9-1)}$$

$$\arctan\left(\frac{2s_{02}c_{02}}{2c_{02}^2 - \eta_2 - 1}\right) - \Phi_{011} \leq \Delta_\theta$$

$$-\Delta_\theta \leq \omega_1(T_2 - T_1) + \arctan\left(\frac{s_{12}c_\phi}{c_{12}c_\phi - c_{02\phi}\eta_2}\right) - \quad \text{(Formula 9-2)}$$

$$\arctan\left(\frac{2s_{12}(c_{12} - c_{02}\eta_2)}{2c_{12}(c_{12} - c_{02}\eta_2) + (\eta_2 - 1)(\eta_2 + 1)}\right) - \Phi_{111} \leq \Delta_\theta$$

$$\eta_1 - \frac{1}{b_{01}}[-b_{00} - \omega_0(T_2 - T_1) + \Phi_{011} - \Delta_\theta] \leq \eta_2 \leq \quad \text{(Formula 10-1)}$$

$$\eta_1 - \frac{1}{b_{01}}[-b_{00} - \omega_0(T_2 - T_1) + \Phi_{011} + \Delta_\theta], \ b_{01} > 0$$

$$\eta_1 - \frac{1}{b_{01}}[-b_{00} - \omega_0(T_2 - T_1) + \Phi_{011} + \Delta_\theta] \leq \eta_2 \leq \quad \text{(Formula 10-2)}$$

$$\eta_1 - \frac{1}{b_{01}}[-b_{00} - \omega_0(T_2 - T_1) + \Phi_{011} - \Delta_\theta], \ b_{01} < 0$$

$$\eta_1 - \frac{1}{b_{11}}[-b_{10} - \omega_1(T_2 - T_1) + \Phi_{111} - \Delta_\theta] \leq \eta_2 \leq \quad \text{(Formula 10-3)}$$

$$\eta_1 - \frac{1}{b_{11}}[-b_{10} - \omega_1(T_2 - T_1) + \Phi_{111} + \Delta_\theta], \ b_{11} > 0$$

$$\eta_1 - \frac{1}{b_{11}}[-b_{00} - \omega_0(T_2 - T_1) + \Phi_{111} + \Delta_\theta] \leq \eta_2 \leq \quad \text{(Formula 10-4)}$$

$$\eta_1 - \frac{1}{b_{11}}[-b_{00} - \omega_0(T_2 - T_1) + \Phi_{111} - \Delta_\theta], \ b_{11} < 0$$

Figure 6:
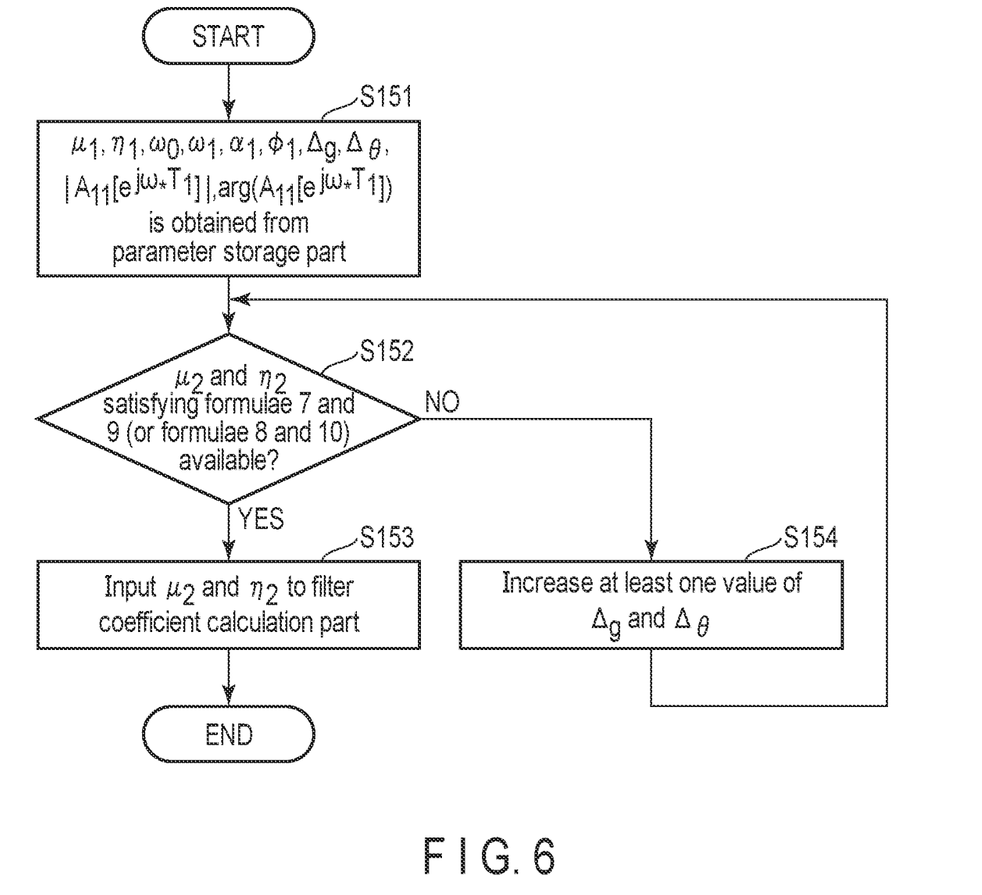
FIG. 6 is a flowchart of a process operation when a second design parameter is determined by the magnetic disk device of the first embodiment.

FIG. 6 is a flowchart of a process operation when a second parameter is determined by the magnetic disk device of the first embodiment, and corresponds to details of step S106 of FIG. 5.

The design parameter transformation part 632 acquires, from the parameter storage part 90, matching parameters $\alpha_1$ and $\Phi_1$ preliminarily derived with respect to the first sampling period $T_1$ stored in step S11 of FIG. 4, first design parameters $\eta_1$ and $\mu_1$, first angular frequency $\omega_0$, second angular frequency $\omega$ which is an approximate value of the first angular frequency $\omega_0$, and furthermore, an absolute value and a phase of filter of $A_{11}[z]$ derived with respect to each of angular frequencies $\omega_0$ and $\omega_1$ in step S12 (step S151). The design parameter transformation part 632 searches the second design parameters $\eta_2$ and $\mu_2$ satisfying formulae 7 and 9 (step S152). Note that, in step S152, the design parameter transformation part 632 may search second design parameters $\eta_2$ and $\mu_2$ satisfying formulae 8 and 10.

In step S152, if desired second design parameters $\eta_2$ and $\mu_2$ are found, the second design parameters $\eta_2$ and $\mu_2$ found are output to the filter coefficient calculation part 633 (Yes in step S152, step S153).

On the other hand, if desired second design parameters $\eta_2$ and $\mu_2$ are not found in step S152, the process of step S152 is repeated while at least one of the gain acceptable deviation $\Delta_g$ and the phase acceptable deviation $\Delta_\theta$ is increased such that satisfying second design parameters are eventually found (No in step S152, step S154).

Through the aforementioned procedure, second design parameters $\eta_2$ and $\mu_2$ are acquired.

Referring to FIG. 5, the filter coefficient calculation part 633 calculates the coefficients of filer $A_{22}[z]$ through the formula 3-2 using the second sampling period $T_2$, matching parameters $\alpha_1$ and $\Phi_1$, second design parameters $\eta_2$ and $\mu_2$ derived in step S105, and first angular frequency $\omega_0$, and sets the coefficients in firmware (may be referred to as FW) (step S107).

In step S105, if not $T_1 \neq T_2$ and $T_2 \neq T_3$ (No in step S105) and $T_1 = T_2$ and $T_2 \neq T_3$ (Yes in step S109), the filter coefficient calculation part 633 substitutes matching parameters $\alpha_1$ and $\Phi_1$ with respect to the first sampling period $T_1$ of the parameter storage part 90, first design parameters $\eta_1$ and $\mu_1$, and first angular frequency $\omega_0$ in $A_{11}[z]$, and sets the derived filter coefficients initial value to FW (step S110).

If the filter coefficients are set to FW in steps S107 and S110, the filter coefficient calculation part 633 sets the sampling period $T_3$ which actually operates as the sampling period $T_2$ determined by the sampling period determination part 631 (step S108).

Through the aforementioned procedure, the coefficients of filter A[z] applicable to the second sampling period $T_2$ are derived, and reflected upon the loop shaping filter 622.

Figure 7:
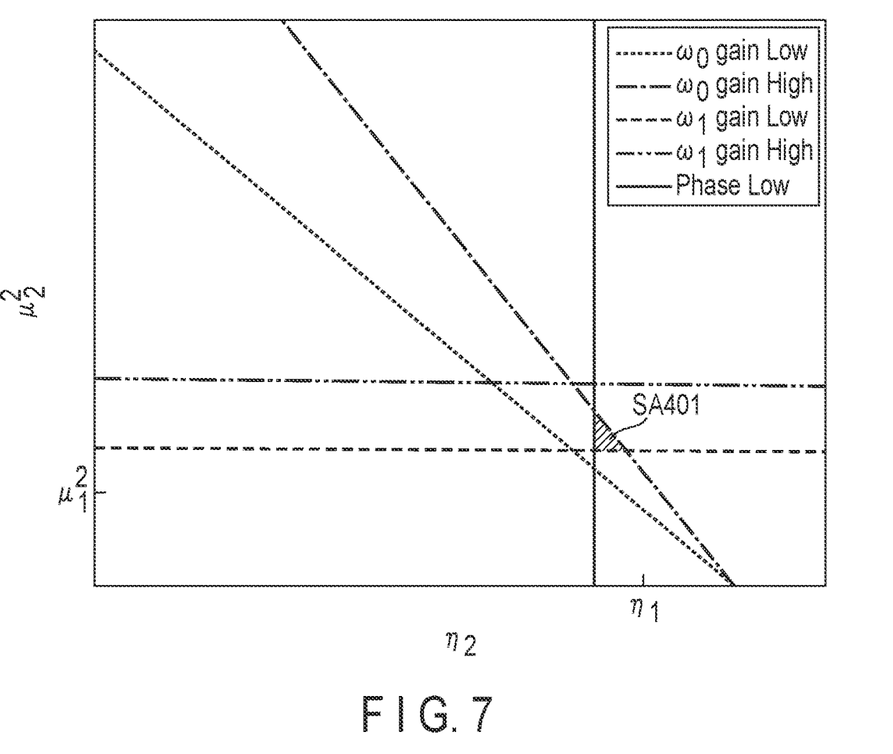
FIG. 7 illustrates a relationship between first and second design parameters of the first embodiment.

FIG. 7 illustrates a relationship between first and second design parameters of the magnetic disk device of the first embodiment.

SA 401 is an example of an area satisfying formulae 8 and 10 when first design parameters corresponding to frequency response FC 101 of FIG. 3 and the like are used. In step S152 of FIG. 6, indicated is a case where second design parameters $\eta_2$ and $\mu_2$ are selected from the area SA 401. Note that a method of searching second design parameters $\eta_2$ and $\mu_2$ in step S152 of FIG. 6 may be, for example, a round-robin calculation of parameters if a change in the sampling period T is not so frequent and time allows.

Through the aforementioned procedure, the magnetic disk device of the present embodiment recalculates a filter coefficients when detecting a change in the sampling period of servo information, and changes characteristics of the filter suppressing NRRO.

Second Embodiment

In the present embodiment, explained is a case where the design parameter transformation part 632 derives second design parameters $\eta_2$ and $\mu_2$ such that gains become equal between first angular frequency $\omega_0$ and second angular frequency $\omega_1$ in first sampling period $T_1$ and second sampling period $T_2$.

Figure 8:
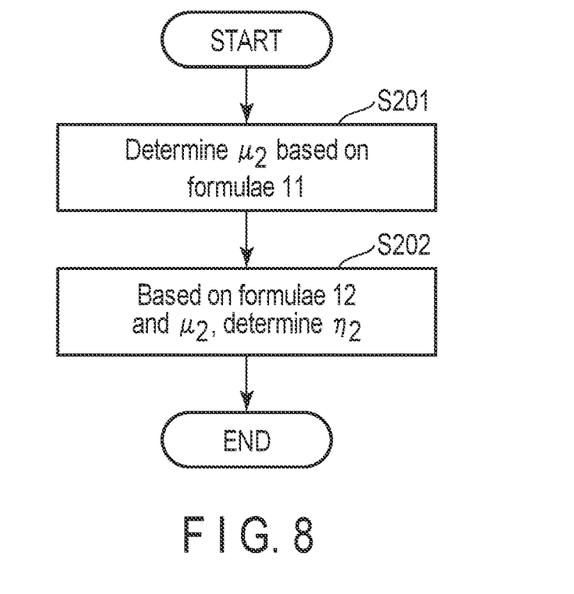
FIG. 8 is a flowchart of a process operation when a second design parameter is determined by a magnetic disk device of a second embodiment.

FIG. 8 is a flowchart of a process operation performed when second design parameters are determined by the magnetic disk device of the second embodiment.

The design parameter transformation part 632 derives second design parameter $\eta_2$ satisfying formula 11 where gains become equal between first angular frequency $\omega_0$ and second angular frequency $\omega_1$ in first sampling period $T_1$ and second sampling period $T_2$ ($\Delta_g = 0$ in formula 4) (step S201).

$$\Lambda_{011} \frac{1 - 4c_{02}^2 \eta_2 + 2(4c_{02}^2 - 1)\eta_2^2 - 4c_{02}^2 \eta_2^3 + \eta_2^4}{c_\phi^2 - 2c_\phi c_{02} c_{02\phi} \eta_2 + c_{02\phi}^2 \eta_2^2} = \quad \text{(Formula 11)}$$

$$\Lambda_{111} \frac{1 - 4c_{12}c_{02}\eta_2 + 2(2c_{12}^2 + 2c_{02}^2 - 1)\eta_2^2 - 4c_{12}c_{02}\eta_2^3 + \eta_2^4}{c_\phi^2 - 2c_\phi c_{12} c_{02\phi} \eta_2 + c_{02\phi}^2 \eta_2^2}$$

Using second design parameter 12 derived in step S201, second design parameter $\mu_2$ is derived from formula 12 (step S202).

$$\mu_2 = \mu_1 \left[ \Lambda_{011} \frac{1 - 4c_{02}^2 \eta_2 + 2(4c_{02}^2 - 1)\eta_2^2 - 4c_{02}^2 \eta_2^3 + \eta_2^4}{c_\phi^2 - 2c_\phi c_{02} c_{02\phi} \eta_2 + c_{02\phi}^2 \eta_2^2} \right]^{\frac{1}{2}} \quad \text{(Formula 12)}$$

Or, second design parameters $\eta_2$ and $\mu_2$ may be derived using formulae 13 (formula 13-1 and formula 13-2) which are approximate formulae in which the gains become equal.

$$\eta_2 = \eta_1 - \frac{a_{00}\Lambda_{011} - a_{10}\Lambda_{111}}{a_{01}\Lambda_{011} - a_{11}\Lambda_{111}} \quad \text{(Formula 13-1)}$$

$$\mu_2 = \mu_1 \left[ \frac{\Lambda_{011}\Lambda_{111}(a_{01}a_{10} - a_{00}a_{11})}{a_{01}\Lambda_{011} - a_{11}\Lambda_{111}} \right]^{\frac{1}{2}} \quad \text{(Formula 13-2)}$$

Figure 9:
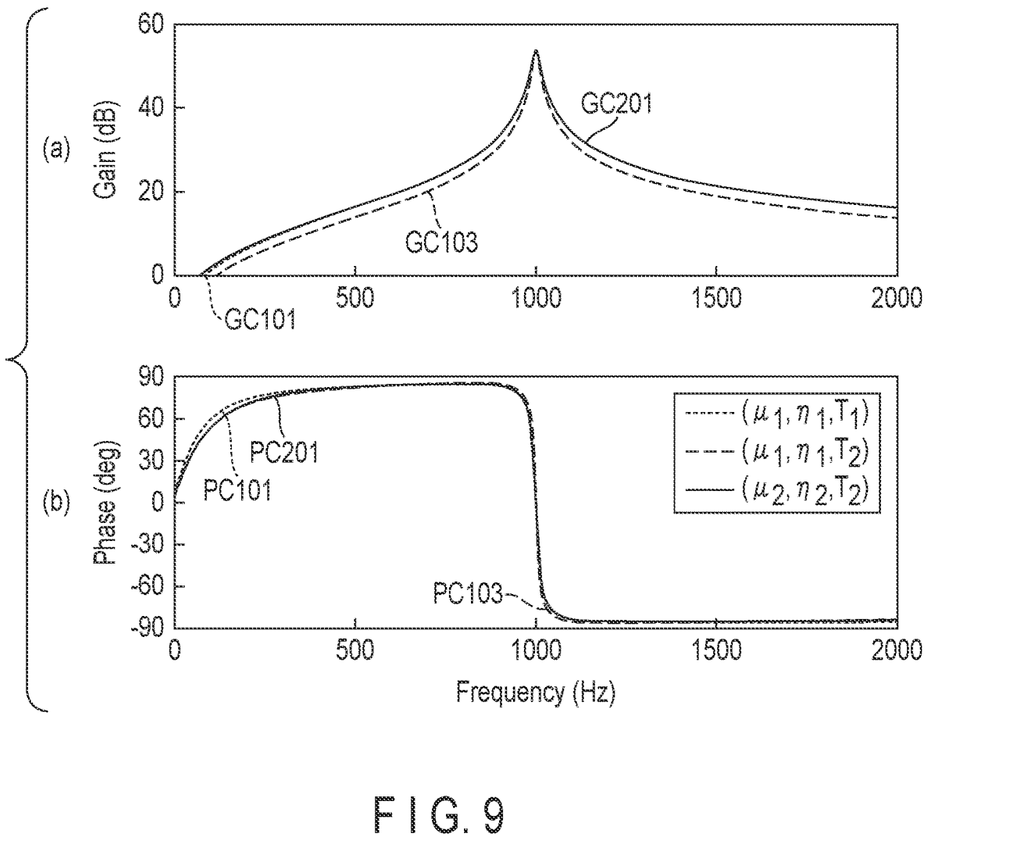
FIG. 9 illustrates an example of frequency response of filter A[z] of the magnetic disk device of the second embodiment.

FIG. 9 illustrates an example of frequency response of filter A[z] of the magnetic disk device of the second embodiment.

Frequency response FC 201 (GC 201 and PC 201) are frequency response of filter A[z] when the first design parameters corresponding to GC 101 (FC 101) of FIG. 3 derived in the sampling period $T_1$ is transformed to the second design parameters of the sampling period $T_2$ by formula 13. While the sampling period changes, the frequency response FC 201 are substantially the same as the frequency response FC 101 (GC 101 and PC 101) before transformation.

Third Embodiment

In the present embodiment, explained is a case where a second design parameters derived from transformation in step S106 of FIG. 5 is preliminarily calculated, and stored in the parameter storage part as table data. Specifically, a parameter transformation value with respect to candidates for possible second sampling period $T_2$ is calculated, and the parameter transformation value is stored in the parameter storage part 90.

Figure 10:
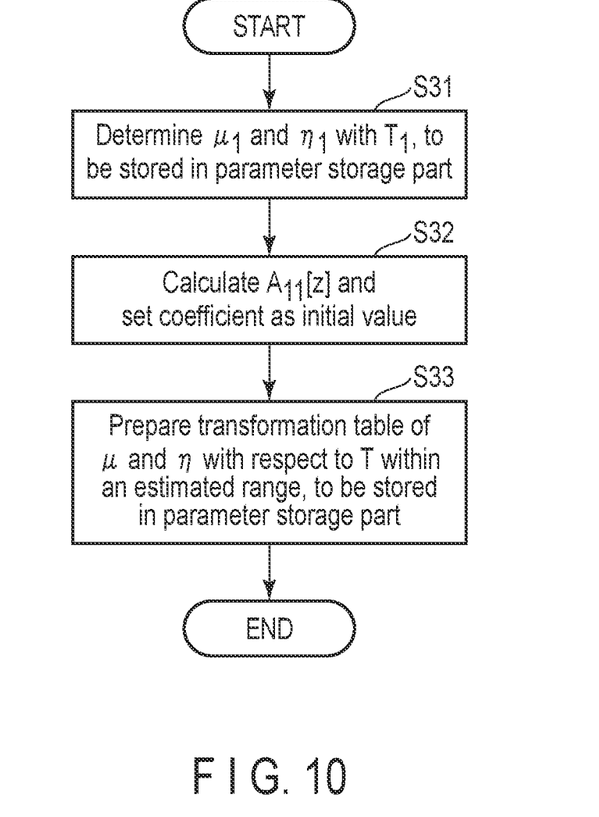
FIG. 10 is a flowchart of a process operation during a design of the parameters of a magnetic disk device of a third embodiment.

FIG. 10 is a flowchart of a process operation during a design of the parameters of a magnetic disk device of the third embodiment.

First design parameters $\eta_1$ and $\mu_1$ determined with respect to the first sampling period $T_1$ are stored in the parameter storage part 90 (step S31). The parameter transformation part 632 sets the parameters stored in the parameter storage part 90 in step S11 to $A_{11}[z]$ of formula 3-1 as an initial value and derives $A_{11}[z]$ (step S32).

Formulae 11 and 12 or 13 are preliminarily calculated with respect to multiple candidates of the second sampling period $T_2$ in a range determined by the sampling period determination part 631, and are stored in the parameter storage part 90 as a transformation table of $\eta$ and $\mu$, for example.

Figure 11:
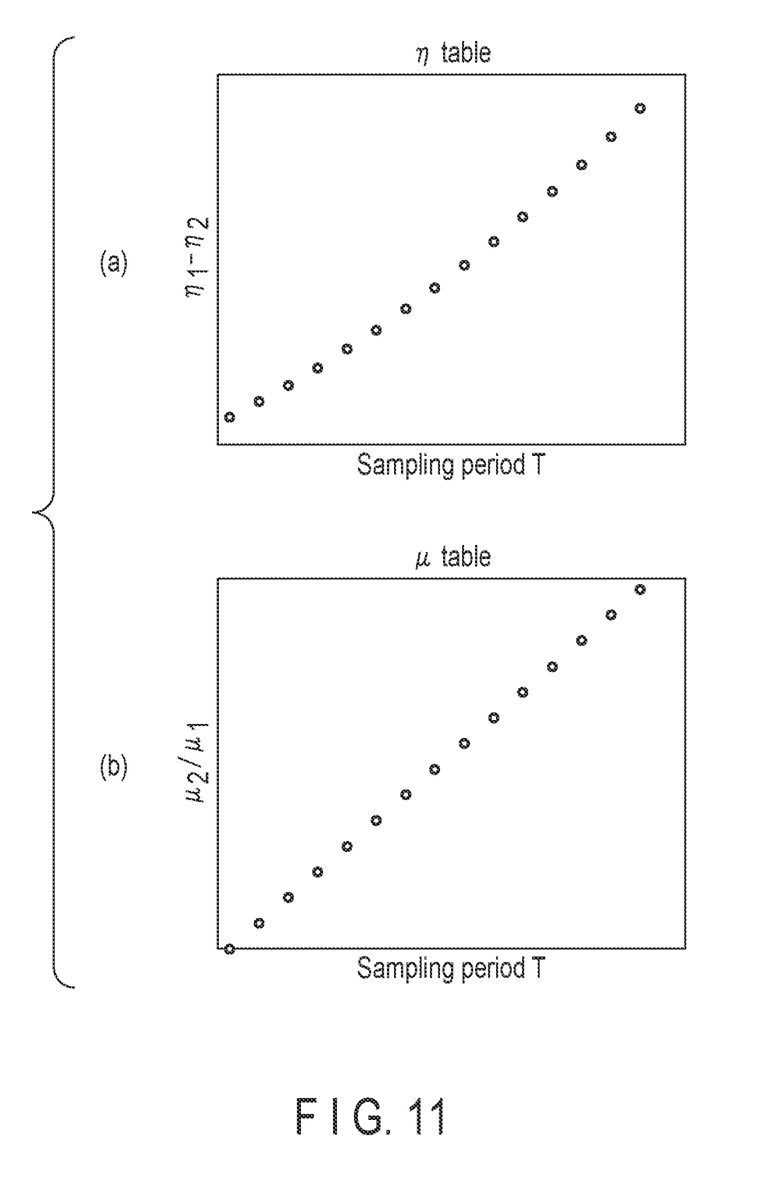
FIG. 11 illustrates an example of a table indicative of a relationship between first and second designed parameters of the magnetic disk device of the third embodiment.

FIG. 11 is an example of a table indicative of a relationship between first and second design parameters of the magnetic disk device of the third embodiment, which is an example of a table of ($\eta_1-\eta_2$ and $\mu_2/\mu_1$) derived from formulae 13 stored in the parameter storage part 90. FIG. 11(*a*) indicates $\eta_1-\eta_2$ per sampling, and FIG. 11(*b*) indicates $\mu_2/\mu_1$ per sampling.

Figure 12:
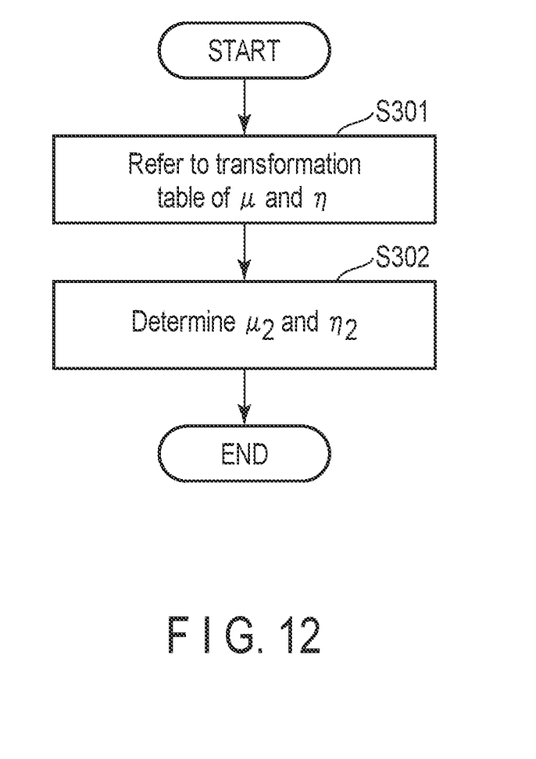
FIG. 12 is a flowchart indicative of a process operation during the operation after shipment of the magnetic disk device of the third embodiment.

FIG. 12 is a flowchart of a process operation during the operation after shipment of the magnetic disk device of the third embodiment.

Upon determination of a change in the sampling period by the sampling period determination part 631, the design parameter transformation part 632 refers to a transformation value table (corresponding to FIG. 11) of the parameter storage part 90 (step S301), and transforms currently-used first design parameters $\eta_1$ and $\mu_1$ to second design parameters $\eta_2$ and $\mu_2$ (step S302).

Through the aforementioned procedure, the magnetic disk device 1 can adapt the controller to a change of the sampling period.

According to at least one of the aforementioned embodiments, a magnetic disk device which can change filter characteristics of the controller to adapt to the sampling period of servo information.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Furthermore, the steps indicated in the flowcharts, sequence charts, and the like may be realized by hardware such as CPU, IC chip, digital signal treatment processor (Digital Signal Processor: DSP), software operable in a computer including a microcomputer (program, for example), or a combination of hardware and software. Furthermore, claims written as a control logic, as a program including instructions executing in a computer, or as a computer-readable recording medium with the instruction are encompassed within the scope of the invention. Furthermore, terms used in the above are not limited, and other expressions which are understandable as substantially the same are encompassed within the scope of the invention.

What is claimed is:

1. A magnetic disk device, comprising:
    a loop shaping filter disposed in parallel to a controller, having a peak in a predetermined frequency, and through digital filter coefficients of which are determined by a sensitivity function and a controlled object, wherein filter coefficients of the digital filter are determined based on a change in a sampling period of servo information; and
    a filter coefficient update controller configured to, based on at least a first sampling period, first angular frequency peak of which is a gain characteristic of a first digital filter, where first filter coefficients of the digital filter derived with respect to the first sampling period is applied to the first digital filter, second angular frequency which is different from the first angular frequency, and a first matching parameter used to derive the first filter coefficients,
    derive second filter coefficients of the digital filter with respect to a second sampling period which is different from the first sampling period.

2. The magnetic disk device of claim 1, comprising a filter coefficient calculation controller configured to calculate the second filter coefficients using at least the sampling period, the first matching parameter, the first angular frequency, and the second angular frequency, wherein
    the filter coefficient calculation controller calculates, when the sampling period is changed from the first sampling period to the second sampling period, the second filter coefficients, and applies the calculated second filter coefficients to the digital filter.

3. The magnetic disk device of claim 1, wherein the filter coefficient update controller derives a gain deviation which is a difference between a first gain of the first angular frequency and a second gain of the second angular frequency, and derives the second filter coefficients based on a predetermined tolerance of gain deviation.

4. The magnetic disk device of claim 3, wherein the filter coefficient update controller derives a phase deviation which is a difference between a first phase of the first angular frequency and a second phase of the second angular frequency, and derives the second filter coefficients based on a predetermined tolerance of phase deviation.

5. The magnetic disk device of claim 4, wherein the tolerance of gain deviation is 0.

6. The magnetic disk device of claim 5, wherein at least one of the tolerance of gain deviation and the tolerance of phase deviation is adjusted.

7. The magnetic disk device of claim 1, comprising:
    a filter coefficient calculation controller configured to calculate third filter coefficients which with respect to a plurality of third sampling periods which are candidates for the second sampling period; and,
    a parameter storage configured to store the third filter coefficients, wherein
    the filter coefficient update controller acquires, when the sampling period is changed from the first sampling period to the second sampling period, the third filter coefficients with respect to the second sampling period from the parameter storage, and applies the acquired third filter coefficients to the digital filter.

* * * * *